3,655,681
Patented Apr. 11, 1972

3,655,681
CERTAIN 2-AMINO-3,6-BIS LOWER-ALKOXY CARBONYL - 4,5,6,7 - TETRAHYDRO THIENO[2,3-c] PYRIDINES
Michio Nakanishi and Tetsuya Tahara, Nakatsu, Oita, Hiroshi Imamura, Ichikawa, Chiba, and Yutaka Maruyama, Tokyo, Japan, assignors to Yoshitomi Pharmaceutical Industries, Ltd., Osaka, Japan
No Drawing. Original application Nov. 29, 1968, Ser. No. 780,218, now Patent No. 3,563,997, dated Feb. 16, 1971. Divided and this application Oct. 28, 1970, Ser. No. 84,876
Int. Cl. C07d 31/50
U.S. Cl. 260—294.8 C     3 Claims

ABSTRACT OF THE DISCLOSURE

Thienopyridine derivatives of the formula

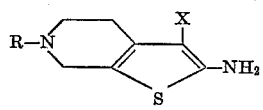

wherein R is H, acetyl, allyl, 2-propynyl, 3-chloro-2-hydroxypropyl, carboxymethyl, alkyl of 1 to 8 carbon atoms, alkoxycarbonyl wherein the alkoxy moiety contains from 1 to 4 carbon atoms, hydroxyalkyl wherein the alkyl moiety contains from 1 to 4 carbon atoms, alkoxycarbonylalkyl wherein the alkoxy and alkyl moieties each independently contains from 1 to 4 carbon atoms, phenethyl, benzyl, mono-, di- or tri-substituted benzyl or benzoyl in which the substituents are Cl, methyl or methoxy, and X is cyano, carbamoyl or alkoxycarbonyl wherein the alkoxy moiety contains from 1 to 4 carbon atoms, are analgesic and anti-inflammatory agents.

CROSS REFERENCE TO RELATED APPLICATIONS

This application is a divisional of our copending application, Ser. No. 780,218 filed Nov. 29, 1968, now U.S. Pat. No. 3,563,997 granted on Feb. 16, 1971.

This invention relates to novel and therapeutically valuable thienopyridine derivatives.

The novel thienopyridine derivatives of the invention are of the formula:

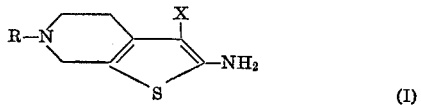

wherein R is H, acetyl, allyl, 2-propynyl, 3-chloro-2-hydroxy-propyl, carboxymethyl, alkyl of 1 to 8 carbon atoms such as methyl, ethyl, propyl, isopropyl, butyl, isobutyl, sec-butyl, t-butyl, pentyl, hexyl, octyl, alkoxycarbonyl (alkoxy being of 1 to 4 carbon atoms) such as methoxycarbonyl, ethoxycarbonyl, propoxycarbonyl, isopropoxycarbonyl, butoxycarbonyl, sec-butoxycarbonyl, t-butoxycarbonyl, hydroxyalkyl (alkyl being of 1 to 4 carbon atoms) such as hydroxymethyl, hydroxyethyl, hydroxypropyl, hydroxybutyl, alkyocarbonylalkyl (alkoxy and alkyl each being of 1 to 4 carbon atoms) such as methoxycarbonylbutyl, butoxycarbonylmethyl, ethoxycarbonylpropyl, propoxycarbonylethyl, phenethyl, benzyl or mono-, di- or tri-substituted benzyl or benzoyl in which the substituents are each selected from the group consisting of Cl, methyl and methoxy, and X is cyano, carbamoyl or alkoxycarbonyl (alkoxy being of 1 to 4 carbon atoms) such as methoxycarbonyl, ethoxycarbonyl, propoxycarbonyl, iso-propoxycarbonyl, butoxycarbonyl, iso-butoxycarbonyl, sec-butoxycarbonyl, t-butoxycarbonyl.

The compounds of Formula I are produced by reacting a compound of the formula

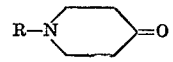

with a compound of the formula $$X\!-\!CH_2\!-\!CN \qquad (III)$$

and sulfur in the presence of an organic base, optimally a secondary amine.

Suitable secondary amines are, for example, dimethylamine, diethylamine, morpholine, pyrrolidine or piperidine.

The compounds of Formula I are also produced in a modified manner, namely by first reacting a compound of Formula II with a secondary amino and then reacting the resulting enamino of the formula

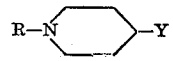

with a compound of Formula III and sulfur, or by first reacting a compound of Formula II with a compound of Formula III and then reacting the compound (V) thus obtained

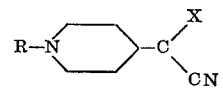

with sulfur in the presence of a secondary amine.

Moreover, the compounds of Formula I when R is other than hydrogen are produced by reacting a compound of the formula

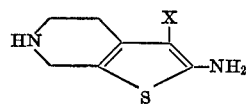

with a compound of the formula $$R^1\!-\!Z \qquad (VII)$$

wherein $R^1$ is equivalent to R excluding hydrogen, and Z is halogen (e.g. Cl, Br or I).

The compound of Formula II may preferably be used in the form of salt such as hydrochloride, especially when R is H.

These reactions are carried out in an inert solvent such as methanol, ethanol, benzene and toluene, at room temperature or at an elevated temperature, optionally in the presence of a dehydrating agent such as p-toluenesulfonic acid, or in the presence of a deacidifying agent such as sodium carbonate, potassium carbonate and pyridine.

Thus-produced thienopyridine derivatives represented by Formula I can form acid addition salts with various inorganic or organic acids such as hydrochloric, hydrobromic, sulfuric, nitric, oxalic, maleic, fumaric, tartaric and malonic acids and the like.

Thienopyrimidine derivatives of Formula I as well as their pharmaceutically acceptable acid addition salts are useful as analgesic and anti-inflammatory agents. For example, compounds of Formula I listed below have the following pharmacological properties.

(1) Inhibition of carrageenin edema (Donryu rat, male; 130 to 200 grams) observed according to the method described by Charles A. Winter et al. in Proceedings of the Society for Experimental Biology and Medicine, New York, vol. 111, pp. 544–547 (1962).

TABLE 1

| Compound: | Dose (mg./kg.) per os | Inhibition (percent) | $ED_{50}$ (mg./kg.) |
|---|---|---|---|
| A | 50 | 49 | 64 |
|  | 100 | 57 |  |
|  | 250 | 80 |  |
| B | 50 | 25 | 115 |
|  | 100 | 48 |  |
|  | 250 | 69 |  |
| C | 50 | 29 | 110 |
|  | 200 | 52 |  |
|  | 250 | 65 |  |
| D | 50 | 44 | 44 |
|  | 100 | 77 |  |
|  | 250 | 82 |  |
| E | 50 | 27 | 95 |
|  | 100 | 62 |  |
|  | 250 | 61 |  |
| F | 50 | 38 | 105 |
|  | 100 | 41 |  |
|  | 250 | 75 |  |
| G | 50 | 34 | 100 |
|  | 100 | 56 |  |
|  | 250 | 56 |  |
| Phenylbutazone | 50 | 8 | 380 |
|  | 100 | 15 |  |
|  | 250 | 44 |  |
| Aminopyrine | 100 | 38 | 210 |
|  | 250 | 49 |  |
|  | 500 | 74 |  |

Remarks:

(A) 2-amino-6-benzyl-3-methoxycarbonyl-4,5,6,7-tetrahydro-thieno(2,3-c)pyridine (B) 2-amino-6-ethoxycarbonyl-3-methoxycarbonyl-4,5,6,7-tetrahydro-thieno(2,3-c)pyridine (C) 2-amino-6-benzyl-3-ethoxycarbonyl-4,5,6,7-tetrahydro-thieno(2,3-c)pyridine (D) 2-amino-6-benzyl-3-ethoxycarbonyl-4,5,6,7-tetrahydro-thieno(2,3-c)pyridine hydrochloride (E) 6-acetyl-2-amino-3-ethoxycarbonyl-4,5,6,7-tetrahydro-thieno(2,3-c)pyridine (F) 2-amino-6-benzyl-3-cyano-4,5,6,7-tetrahydro-thieno(2,3-c)pyridine (G) 2-amino-6-butyl-3-ethoxycarbonyl-4,5,6,7-tetrahydro-thieno(2,3-c)pyridine hydrochloride (2) Effect on the reaction-threshold to the carrageenin inflamed rat's paw (Donryu rat, male; 120 to 180 grams) 150 minutes after oral administration of the compound (I) observed according to the method described in "Archives Internationales de Pharmacodynamie et de Therapie" vol. 111, 409–419 (1957).

TABLE 2

| Compound: | Dose (mg./kg.) | Reaction-threshold (mm. Hg) Inflamed paw | Reaction-threshold (mm. Hg) Non-inflamed paw | $IT_{50}$** (mg./kg.) |
|---|---|---|---|---|
| A* | 0 | 66.4 | 134.0 | 30 |
|  | 50 | 152.8 | 154.4 |  |
|  | 100 | 203.6 | 210.4 |  |
| C | 0 | 83.2 | 150.0 | 47 |
|  | 50 | 128.0 | 153.2 |  |
|  | 100 | 174.0 | 165.6 |  |
|  | 250 | 225.6 | 179.6 |  |
| D | 0 | 89.2 | 139.2 | 16.5 |
|  | 25 | 161.6 | 136.4 |  |
|  | 50 | 204.8 | 143.2 |  |
|  | 100 | 219.4 | 152.8 |  |
| F | 0 | 87.6 | 135.2 | 72 |
|  | 50 | 131.6 | 141.2 |  |
|  | 100 | 141.2 | 142.0 |  |
|  | 250 | 194.8 | 149.6 |  |
| G | 0 | 92.4 | 136.8 | 68 |
|  | 50 | 126.8 | 139.2 |  |
|  | 100 | 167.6 | 143.6 |  |
|  | 250 | 208.5 | 222.0 |  |
| Phenylbutazone | 0 | 78.4 | 121.2 | >250 |
|  | 50 | 94.8 | 135.6 |  |
|  | 100 | 117.2 | 136.4 |  |
|  | 250 | 107.6 | 134.4 |  |
| Mefenamic acid | 0 | 90.0 | 141.6 | 94 |
|  | 50 | 116.8 | 145.6 |  |
|  | 100 | 148.8 | 155.6 |  |
|  | 250 | 152.0 | 164.4 |  |

*Compound designation is the same as in Table 1.
**$IT_{50}$ is the dose required to cause increase of the reaction-threshold by 50 mm. Hg.

Acute toxicity ($LD_{50}$) of 2-amino-6-benzyl-3-ethoxycarbonyl-4,5,6,7-tetrahydro-thieno(2,3-c)pyridine hydrochloride is as follows:

TABLE 3

| Route | ($LD_{50}$) (mg./kg.) Wistar rat Male | Wistar rat Female | dd mouse Male | dd mouse Female |
|---|---|---|---|---|
| Oral | 7,600 | 4,750 | 1,890 | 2,050 |
| Subcutaneous | >10,000 | >10,000 | >10,200 | >10,500 |
| Intraperitoneal | 1,350 | 1,520 | 510 | 620 |

The compounds (I) of the invention and pharmaceutically acceptable acid addition salts thereof can be administered safely per se as analgesics and anti-inflammatory agents or in the form of a pharmaceutical composition in admixture with a suitable and conventional carrier or adjuvant, administrable orally or by way of injection, without causing harm to the host.

The pharmaceutical composition can take the form of tablets, granules, powders, capsules, etc. for oral administration; or of injectable solution for subcutaneous or intramuscular administration; or of cream, ointment, suppository, etc. for topical administration.

Among these preparations, forms of tablets, granules, powders, and capsules are especially perferable.

The choice of carrier is determined by the preferred form of administration, the solubility of the compounds and standard pharmaceutical practice. The following are examples of formulations when a compound of the present invention is administered for the pharmaceutical purposes.

(A) 25 mg. Capsule:                            Mg.
    Compound I _____ 25
    Lactose _____ 90
    Starch _____ 34
    Magnesium stearate _____ 1

(B) 25 mg. Tablet:                               Mg.
    Compound I _____ 25
    Microcrystalline cellulose _____ 10
    Lactose _____ 64
    Starch _____ 20
    Magnesium stearate _____ 1

(C) 1% Cream:                                   G.
    Compound I _____ 10
    White vaseline _____ 250
    Stearyl alcohol _____ 250
    Glycerol _____ 120
    Sodium lauryl sulfate _____ 10
    Methyl p-hydroxybenzoate _____ 0.25
    Propyl-p-hydroxybenzoate _____ 0.25
    Water: a sufficient quantity to make 1 kilogram.

(D) 1% Ointment:                              G.
    Compound I _____ 10
    White vaseline _____ 890
    Solid paraffin _____ 30
    Beeswax _____ 20
    Cetostearyl alcohol (B.P. 1963, p. 148) _____ 50

(E) 100 mg. Suppository:
    Compound I _____ mg. __ 100
    Witespol * E75 _____ g. __ 1.4
    Witespol * H15 _____ g. __ 0.5

*Product of Chemische Werke Witten, mixture of the triglycerides of natural saturated vegetable fatty acids of the chain length of $C_{12}$–$C_{18}$, containing a quantity of partial glycerides, registered trade names.

Usual daily dose of the compound (I) or salt thereof, lies in the range of about 25 to about 300 milligrams—more practically about 100 to about 200 milligrams per human adult. Thus, in case of capsules each containing 25 milligrams of compound (I) or salt thereof, one to twelve capsules per day are administered.

These compositions are especially useful for the treatment of pain, redness and swelling due to post-operative pain, urological disease or dental disease.

In the following illustrative examples, "g." stands for "grams(s)" and "ml." for "milliliter(s)."

EXAMPLE 1

A solution of 18.9 g. of 1-benzyl-4-piperidine, 10.0 g. of methyl cyanoacetate, 3.4 g. of powdery sulfur and 10.0 g. of morpholine in 60 ml. of methanol is heated moderately under reflux for about 20 minutes to dissolve the powdery sulfur. The mixture is heated under reflux for one further hour to complete the reaction. On standing at room temperature, the mixture yields a precipitate. The precipitate is collected by filtration, washed well with methanol, and recrystallized from methanol to give 27.3 g. (91% yield) of 2-amino-6-benzyl-3-methoxycarbonyl-4,5,6,7 - tetrahydro-thieno(2,3-c)-pyridine as almost colorless needles melting at 124° to 126° C.

EXAMPLE 2

A solution of 22.3 g. of 1-p-chlorobenzyl-4-piperidone, 11.3 g. of ethyl cyanoacetate, 3.3 g. of powdery sulfur and 10 ml. of diethylamine in 70 ml. of ethanol is heated at 40° C. for 30 minutes and further heated under reflux for 30 minutes. On standing at room temperature, the mixture yields a precipitate. The latter is collected by filtration and recrystallized from ethanol to give 30.2 g. (87%) of 2 - amino-6-p-chlorobenzyl-3-ethoxycarbonyl-4,5,6,7 - tetrahydro-thieno-(2,3-c)pyridine as pale yellow needles melting at 133° to 134° C.

A solution of 1.0 g. of the product in 2 ml. of ethanol is added to 20 ml. of a 10% hydrochloric acid solution. The precipitate crystals are collected by filtration and recrystallized from a 70% aqueous ethanol to give 0.95 g. of the hydrochloride as colorless needles melting at 225° to 228° C. with decomposition.

EXAMPLE 3

A solution of 18.9 g. of 1-benzyl-4-piperidone, 6.6 g. of malononitrile, 3.4 g. of sulfur and 9.0 g. of morpholine in 50 ml. of ethanol is heated under reflux for 2 hours. After cooling, the precipitated crystals are collected by filtration and recrystallized from ethanol to give 24.0 g. (93%) of 2 - amino-6-benzyl-3-cyano-4,5,6,7-tetrahydrothieno(2,3-c)pyridine as pale yellow prismatic crystals melting at 149° to 152°C.

Its yellow prismatic hydrochloride melts at 238° C. to 240° C. with decomposition.

EXAMPLE 4

A mixture of 22.6 g. of 1-methyl-4-piperidone, 11.3 g. of ethyl cyanoacetate, 1.6 g. of ammonium acetate, 2.4 g. of glacial acetic acid and 70 ml. of benzene is heated under reflux for 3 hours in a flask connected with a condenser provided with a water-removing adapter, to remove 3.8 ml. of water. After cooling, the mixture is washed with 100 ml. of a cold 10% aqueous potassium carbonate solution, and dried over sodium sulfate. The crude ethyl(1-methyl - 4 - piperididene)cyanoacetate remaining after the benzene removal in vacuo is dissolved in 100 ml. of ethanol. To the ethanolic solution are added, 6.6 g. of sulfur and 19.0 g. of morpholine and the whole is heated under reflux for 1.5 hours. After the ethanol is distilled off in vacuo, 20% aqueous ethanol is added to the residue. The precipitated crystals are collected by filtration and recrystallized from 50% aqueous ethanol to give 40.1 g. (80.2%) of 2-amino-3-ethoxycarbonyl-6-methyl-4,5,6,7-tetrahydro-thieno(2,3-c)-pyridine containing ½ molecule of water of crystallization as pale yellow prismatic crystals melting at 103° to 105° C.

Its hydrochloride in the form of colorless needles, recrystallized from 80% aqueous ethanol, melts at 329° to 251° C. with decomposition.

EXAMPLE 5

A solution of 9.4 g. of 1-benzyl-4-piperidone, 7.0 g. of butyl cyanoacetate, 1.7 g. of sulfur and 4.5 g. of morpholine in 30 ml. of ethanol is heated under reflux for 2 hours. The mixture is allowed to stand overnight in an icebox, whereby crystals precipitate out. They are collected by filtration, washed with cold ethanol, and recrystallized from ethanol to give 15.2 g. (88.5%) of 2-amino-6-benzyl-3-butoxycarbonyl - 4,5,6,7 - tetrahydro-thieno(2,3-c)pyridine as colorless prismatic crystals melting at 60° to 64° C. with decomposition.

Its hydrochloride in the form of pale yellow needles melts at 214° to 216° C.

EXAMPLE 6

A mixture of 14.1 g. of 1-acetyl-piperidone, 9.0 g. of morpholine, 0.2 g. of p-toluenesulfonic acid and 50 ml. of benzene is heated under reflux for 8 hours in a flask connected with a condenser provided with a water-removing adapter, to remove 1.8 ml. of water. After filtering, the benzene is distilled off in vacuo, and the remaining brown viscous crude 1-acetyl-4-morpholino - 1,2,5,6 - tetrahydropyridine is dissolved in 50 ml. of ethanol, and 11.0 g. of ethyl cyanoacetate and 3.2 g. of sulfur are added. The whole is stirred at room temperature for 20 minutes and then heated under reflux for 30 minutes to complete the reaction. Cooling to room temperature affords precipitates, which are collected by filtration and recrystallized from ethanol to give 20.2 g. (76%) of 6 - acetyl - 2 - amino-3-ethoxycarbonyl-4,5,6,7-tetrahydrothieno(2,3-c)pyridine as colorless needles melting at 148° to 151° C.

EXAMPLE 7

A mixture of 8.5 g. of 4-piperidone, 11.3 g. of ethyl cyanoacetate, 3.2 g. of powdery sulfur, 30 ml. of ethanol and 9 ml. of morpholine is heated with stirring at 40° C. for 30 minutes and then at 60° C. for 20 minutes, to dissolve the sulfur. After cooling to room temperature, crystals precipitated are collected by filtration and recrystallized from ethanol to give 11.6 g. (51.3%) of 2-amino-3-ethoxycarbonyl - 4,5,6,7 - tetrahydro-thieno(2,3-c)pyridine as colorless needles melting at 119° to 120° C.

Its hydrochloride melts at 249° to 251° C. with decomposition.

EXAMPLE 8

A mixture of 13.6 g. of 4-piperidone hydrochloride, 11.3 g. of ethyl cyanoacetate, 3.3 g. of sulfur, 100 ml. of ethanol and 9 ml. of morpholine is heated with stirring at 60° C. for 20 minutes, the sulfur dissolving and needles beginning to precipitate. The mixture is heated for further 10 minutes and then cooled to room temperature. The precipitated crystals are collected by filtration and recrystallized from 70% aqueous ethanol to give 20.2 g. (76.5%) of 2-amino-3-ethoxycarbonyl - 4,5,6,7 - tetrahydro-thieno (2,3-c)pyridine hydrochloride as colorless needles melting at 249° to 251° C. with decomposition.

EXAMPLE 9

A mixture of 13.6 g. of 4-piperidone hydrochloride, 14.1 g. of butyl cyanoacetate, 3.2 g. of sulfur, 9 ml. of morpholine and 150 ml. of ethanol is heated with stirring at 40° to 50° C. for about 30 minutes, to dissolve the sulfur. On standing at room temperature, crystals precipitate. They are collected by filtration and recrystallized from 90% aqueous ethanol to give 21.0 g. (72%) of 2-amino-3-butoxycarbonyl - 4,5,6,7 - tetrahydro - thieno(2,3-c)pyridine hydrochloride as colorless needles melting at 223° to 225° C. with decomposition.

Its free base in the form of colorless needles melts at 90° to 93° C.

EXAMPLE 10

A mixture of 13.6 g. of 4-piperidone hydrochloride, 6.6 g. of malononitrile, 3.2 g. of sulfur, 9 ml. of morpholine and 150 ml. of ethanol is heated with stirring at 50° C. for 30 minutes, the sulfur dissolving and crystals beginning to precipitate. On standing at room temperature, crystals precipitate. They are collected by filtration and recrystallized from 50% aqueous ethanol to give 14.5 g. (63%) of 2-amino-3-cyano-4,5,6,7-tetrahydro-thieno(2,3-c)pyridine hydrochloride as pale yellow prismatic crystals melting at 260 to 263° C. with decomposition.

EXAMPLE 11

A mixture of 22.6 g. of 2-amino-3-ethoxycarbonyl-4,5,6,7-tetrahydro-thieno(2,3-c)pyridine, 9.5 g. of 3-chloropropanol, 12.0 g. of potassium carbonate and 100 ml. of ethanol is heated under reflux for 24 hours. After cooling, the reaction mixture is filtered to remove insoluble matter, and 20 ml. of 29% ethanolic hydrochloric acid is added to the filtrate. Crystals precipitated are collected by filtration by means of suction, washed with ethanol, and recrystallized from 80% ethanol to give 22.8 g. of 2-amino - 3 - ethoxycarbonyl - 6 - (3-hydroxypropyl)-4,5,6,7-tetrahydro-thieno(2,3-c)pyridine hydrochloride as colorless needles melting at 230° to 231° C. with decomposition.

EXAMPLE 12

Monochloroacetic acid (4.8 g.) is added to a solution of 2.0 g. of sodium hydroxide in 100 ml. of 95% ethanol, and the whole is well stirred to form a suspension of sodium monochloroacetate. To the suspension are added 10.5 g. of 2-amino-3-ethoxycarbonyl-4,5,6,7-tetrahydro-thieno(2,3-c)pyridine and 7 g. of potassium carbonate. The mixture is heated under reflux for 6 hours. After cooling, the reaction mixture is filtered to remove insoluble matter, and the filtrate is adjusted to pH 7 with 200 ml. of 10% hydrochloric acid. The resulting precipitates are collected by filtration by means of suction, and recrystallized from dimethylformamide to give 8.1 g. of 2-amino-6-carboxymethyl - 3 - ethoxycarbonyl - 4,5,6,7-tetrahydro-thieno(2,3-c)pyridine as colorless powder melting at 250° to 254° C. with decomposition.

In the same manner as in the above examples, the following thieno(2,3-c)pyridine derivatives are also produced:

(13) 2 - amino-6-ethoxycarbonyl-3-methoxycarbonyl-4,5,6,7-tetrahydro-thieno(2,3-c)pyridine as colorless prismatic crystals melting at 147° to 150° C.;

(14) 2-amino-6-cyclohexyl-3-ethoxycarbonyl - 4,5,6,7-tetrahydro-thieno(2,3-c)pyridine as pale yellow needles melting at 87° to 90° C., and its hydrochloride as colorless needles melting at 232° to 235° C. with decomposition;

(15) 2-amino-3,6-diethoxycarbonyl-4,5,6,7-tetrahydro-thieno(2,3-c)pyridine as colorless prismatic crystals melting at 142° to 144° C.;

(16) 2-amino-6-butyl-3-ethoxycarbonyl-4,5,6,7 - tetrahydro-thieno(2,3-c)pyridine hydrochloride as colorless needles melting at 182° to 186° C. with decomposition;

(17) 2-amino-6-benzyl - 3 - ethoxycarbonyl-4,5,6,7-tetrahydro-thieno(2,3-c)pyridine as colorless needles melting at 112° to 113° C., and its hydrochloride as colorless needles melting at 234° to 235° C. with decomposition;

(18) 2-amino-6-p-chlorobenzoyl - 3 - ethoxycarbonyl-4,5,6,7 - tetrahydro - thieno(2,3-c)pyridine as colorless prismatic crystals melting at 215° to 219° C.;

(19) 2-amino-3-ethoxycarbonyl-6-phenethyl - 4,5,6,7-tetrahydro-thieno(2,3-c)pyridine hydrochloride as colorless needles melting at 214° to 215° C. with decomposition;

(20) 6-allyl-2-amino-3-ethoxycarbonyl - 4,5,6,7-tetrahydro-thieno(2,3-c)pyridine melting at 71° to 74° C., and its hydrochloride melting at 234° to 236° C. with decomposition;

(21) 2-amino-3-ethoxycarbonyl - 6 - (2-propynyl)-4,5,6,7-tetrahydro-thieno(2,3-c)pyridine melting at 70° to 73° C., and its hydrochloride melting at 237° C. with decomposition;

(22) 2-amino-3-ethoxycarbonyl-6-m-methylbenzyl-4,5,6,7-tetrahydro-thieno(2,3-c)pyridine hydrochloride as pale yellow needles melting at 228° to 231° C. with decomposition;

(23) 2-amino - 3 - ethoxycarbonyl - 6 -(2-methoxy-5-methylbenzyl) - 4,5,6,7 - tetrahydro-thieno(2,3-c)pyridine hydrochloride as colorless needles melting at 218° to 220° C. with decomposition;

(24) 2-amino-3-ethoxycarbonyl - 6 - (3,4,5 - trimethoxybenzyl)-4,5,6,7 - tetrahydro-thieno(2,3-c)pyridine as colorless needles melting at 141° C., and its hydrochloride as colorless needles melting at 228° to 230° C. with decomposition;

(25) 2-amino - 3 - ethoxycarbonyl - 6 - octyl-4,5,6,7-tetrahydro-thieno(2,3-c)pyridine hydrochloride as pale yellow needles melting at 190° to 193° C.

(26) 2-amino-3-carbamoyl - 4,5,6,7 - tetrahydro-thieno(2,3-c)pyridine melting at 202° to 203° C. with decomposition;

(27) 2-amino- 3 - carbamoyl - 6 - methyl-4,5,6,7-tetrahydro-thieno(2,3-c)pyridine melting at 186° to 189° C. with decomposition;

(28) 2-amino-6-benzyl - 3 - carbamoyl-4,5,6,7-terahydro-thieno(2,3-c)pyridine hydrochloride containing ½ molecule of water of crystallization melting at 222° to 225° C. with with decomposition;

(29) 2 - amino - 3 - carbamoyl - 6 - ethoxycarbonyl-4,5,6,7-tetrahydro-thieno(2,3-c)pyridine melting at 179° to 182° C. with decomposition;

(30) 2-amino - 3 - carbamoyl - 6 - p - chlorobenzoyl-4,5,6,7-tetrahydro-thieno(2,3-c)pyridine melting at 208° to 211° C. with decomposition;

(31) 2-amino - 3 - ethoxycarbonyl-6-(2-hydroxybutyl)-4,5,6,7-tetrahydro-thieno(2,3-c)pyridine melting at 104° to 106° C.;

(32) 2-amino-6-(3-chloro-2-hydroxypropyl)-3-ethoxycarbonyl-4,5,6,7-tetrahydro-thieno(2,3-c)pyridine melting at 119° to 1–2° C.;

(33) 2 - amino - 3-ethoxycarbonyl-6-(2-ethoxycarbonylethyl) - 4,5,6,7 - tetrahydro-thieno(2,3-c)pyridine hydrochloride melting at 176° to 181° C. with decomposition;

(34) 6-acetyl-2-amino-3-carbamoyl-4,5,6,7-tetrahydro-thieno(2,3-c)pyridine melting at 248° to 251° C. with decomposition;

(35) 2-amino-6-butyl-3-carbamoyl-4,5,6,7-tetrahydro-thieno(2,3-c)pyridine hydrochloride containing ⅓ molecule of water of crystallization melting at 167° to 168° with decomposition;

(36) 2-amino-3-carbamoyl-6-(2-propynyl)-4,5,6,7-tetrahydro-thieno(2,3-c)pyridine hydrochloride melting at 219 to 220° C. with decomposition;

(37) 2 - amino - 6-allyl-3-carbamoyl-4,5,6,7-tetrahydro-thieno(2,3-c)pyridine hydrochloride melting at 216° to 129° C. with decomposition.

What is claimed is:
1. A compound of the formula

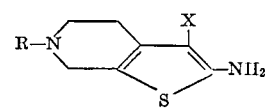

wherein X is a lower-alkoxy carbonyl and R is lower-alkoxy carbonyl.

2. A compound as in claim 1 said compound being 2 - amino - 6-ethoxycarbonyl-3-methoxycarbonyl-4,5,6,7-tetrahydro-thieno(2,3-c)pyridine.

3. A compound as in claim 1, said compound being 2-amino - 3,6 - bis(ethoxycarbonyl) - 4,5,6,7 -tetrahydro-thieno(2,3-c)pyridine.

References Cited

FOREIGN PATENTS 2,004,816    8/1970    Germany _____ 260—294.8

ALAN L. ROTMAN, Primary Examiner

U.S. Cl. X.R.

424—266